United States Patent [19]

Cirami

[11] Patent Number: 5,881,602
[45] Date of Patent: Mar. 16, 1999

[54] GEARSHIFT FOR DUAL DERAILLEUR BICYCLE

[76] Inventor: Salvatore Cirami, 12-21 35th Ave., Apt. 4F, Long Island City, N.Y. 11106

[21] Appl. No.: 821,057

[22] Filed: Mar. 20, 1997

[51] Int. Cl.[6] .................................................. G05G 9/047
[52] U.S. Cl. .................................. 74/473.14; 74/471 XY; 74/473.23; 74/489
[58] Field of Search ............................ 74/473.13, 473.14, 74/471 XY, 489, 506, 531, 473.21, 473.23

[56] References Cited

U.S. PATENT DOCUMENTS

| | | | |
|---|---|---|---|
| 3,808,907 | 5/1974 | Yamaguchi | 74/473.13 X |
| 4,132,296 | 1/1979 | Evett | 74/489 X |
| 4,201,095 | 5/1980 | Cirami | 74/489 X |
| 4,267,742 | 5/1981 | Cabeza | 74/473.13 X |
| 4,270,402 | 6/1981 | Nagano | 74/473.14 |
| 4,279,174 | 7/1981 | Ross | 74/473.14 |
| 4,304,143 | 12/1981 | Nagano | 74/473.14 X |
| 5,400,675 | 3/1995 | Nagano | 74/471 XY X |

*Primary Examiner*—Rodney H. Bonck
*Assistant Examiner*—Ankur Parekh

[57] ABSTRACT

A dual derailleur bicycle gearshift comprises a first cable pull member pivotally secured to a support for rotation about a first axis and a second cable pull member pivotally secured to the first cable pull member for rotation about a second axis perpendicular to the first axis, wherein the second cable pull member defines a single actuator that is centered on both axes for pivotal movability within a first arc located within a first plane that extends axially of and contains the first axis to rotate the second cable pull member about the second axis and pivotal movability within a second arc located within a second plane that extends axially of and contains the second axis to rotate the first cable pull member about the first axis. In a handlebar mounted embodiment the first cable pull member rotates about a longitudinal axis of the bicycle's handlebar and the actuator is a yoke centered on both axes and having one end defining the second cable pull member. In a handlebar stem mounted embodiment the actuator is a lever and the first cable pull member is notched for centering the lever on both axes. In each embodiment a first bracket member stationary with the support provides anchorage for a casing associated with a cable pulled by the first cable pull member, and a second bracket member rotatable with the first cable pull member provides anchorage for a casing associated with a cable pulled by the second cable pull member.

19 Claims, 4 Drawing Sheets

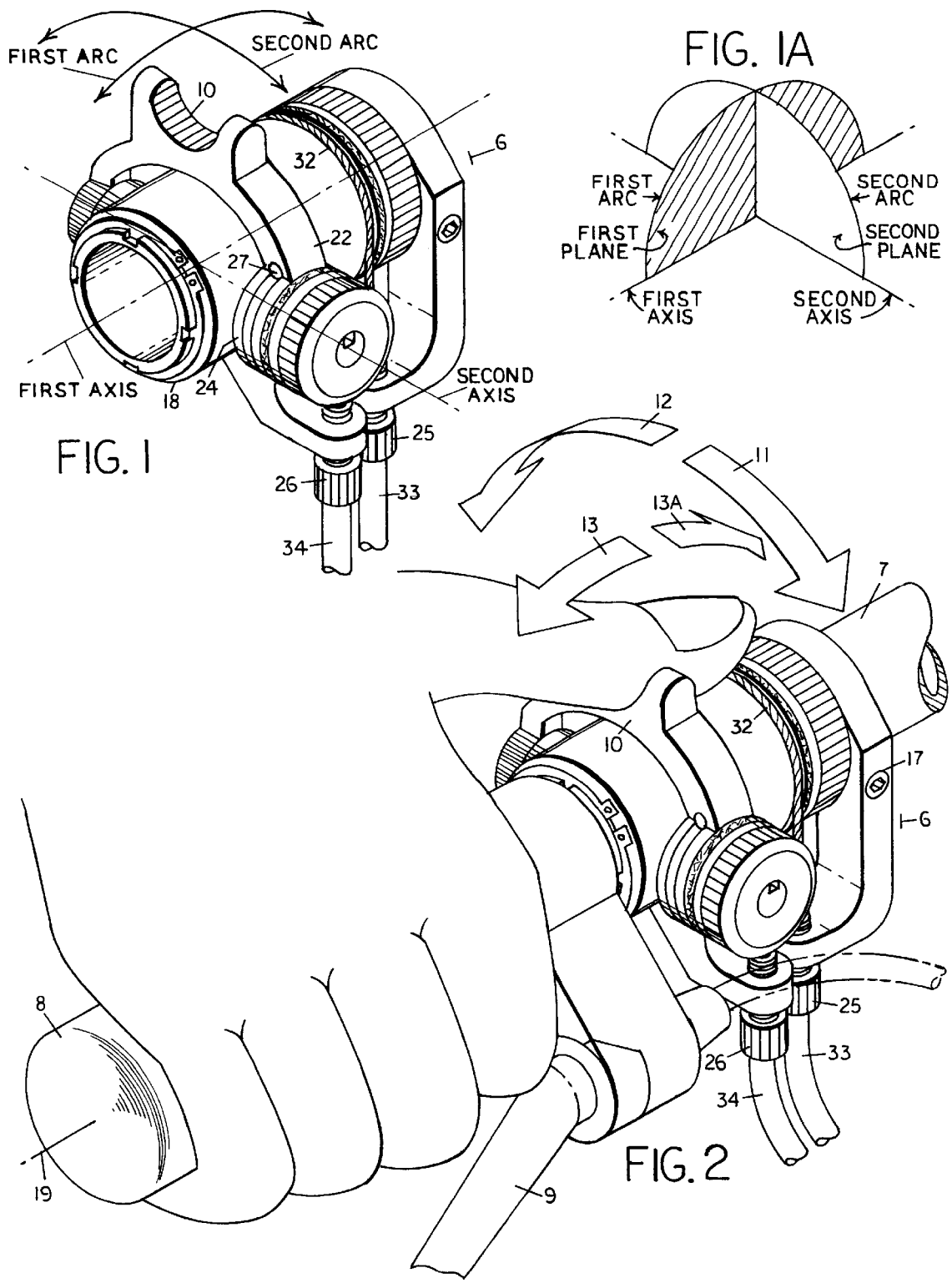

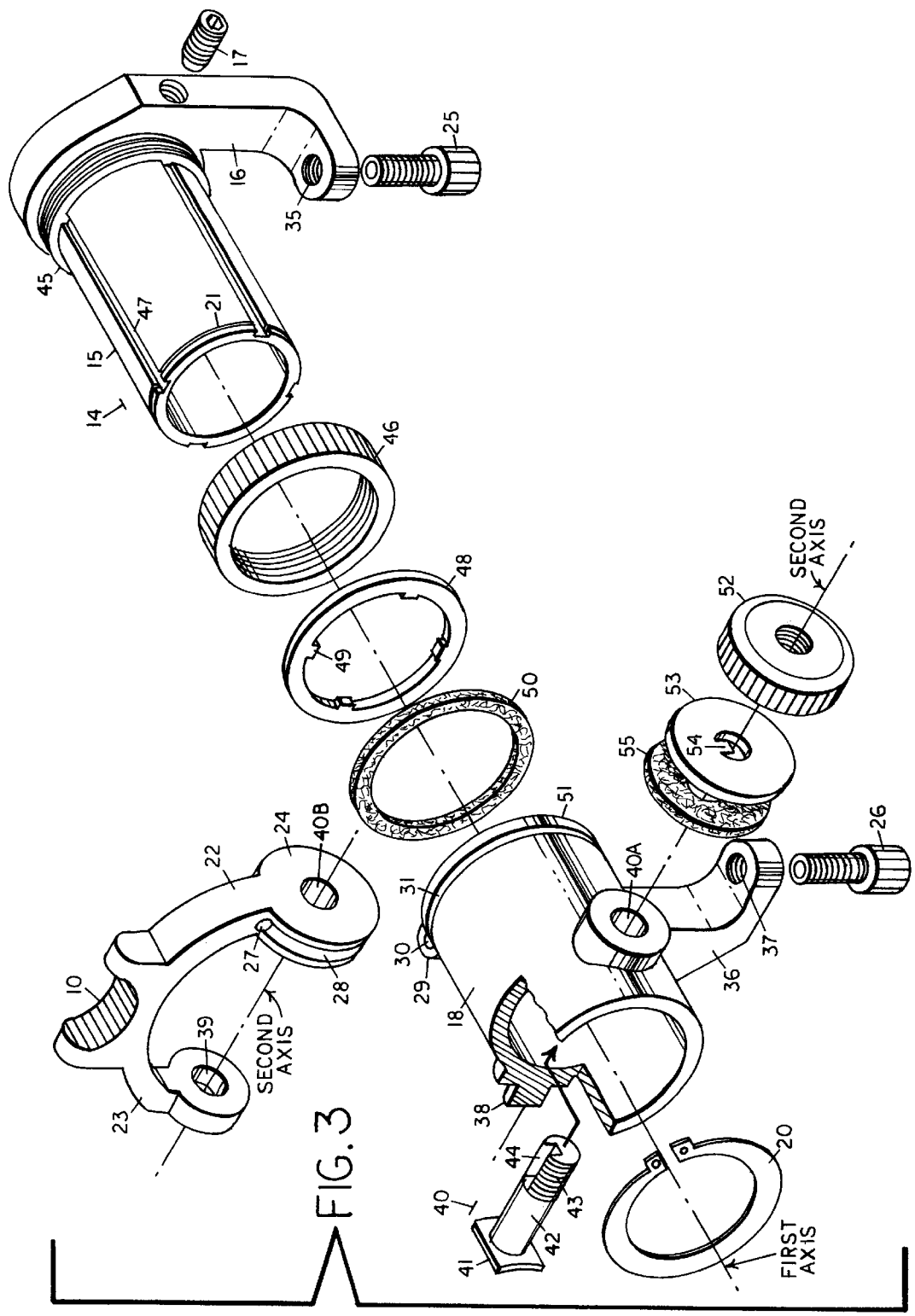

5,881,602

GEARSHIFT FOR DUAL DERAILLEUR BICYCLE

BACKGROUND OF THE INVENTION

This invention pertains generally to a gearshift for use on a dual derailleur type of multi-speed bicycle, more particularly to a gearshift of such type wherein a unitary structure provides manually operable actuator means accessible for controlling the bicycle's front and rear derailleurs, still more particularly to such a gearshift having a single actuator for either independently or simultaneously controlling both the front and rear derailleurs, specifically to the provision of such a gearshift having said single actuator pivotally centered on perpendicular first and second axes for a uniform mode of manipulation about both axes, to the provision of embodiments of such gearshift which may be applied to or retrofitted on any configuration of dual derailleur bicycle, and to the provision of at least one embodiment of such gearshift wherein said single actuator is manipulable while maintaining a hold on both ends of the bicycle's handlebar.

A dual derailleur bicycle is one having multiple front sprockets (typically two or three) of different pitch diameter mounted on the bicycle's pedal crank axis, multiple rear sprockets (typically five, six or seven) of different pitch diameter mounted on the bicycle's rear wheel axis and a roller chain forming a closed loop about one each of said front and rear sprockets. Different gear ratios are effected between the pedal crank and rear wheel axes for greater speed or easier pedaling depending upon which one of the front and rear sprockets are connected together by the roller chain. The roller chain is transferred from one to another of the front and rear sprockets by front and rear derailleur devices which are mounted on the bicycle adjacent the front and rear sprockets, respectively. The front derailleur, when moved alternately in opposite directions axially of the pedal crank axis, derails the roller chain from one front sprocket and positions it upon another, and the rear derailleur, when moved alternately in opposite directions axially of the rear wheel axis, derails the roller chain from one rear sprocket and positions it upon another. The. derailleurs are caused to move from one sprocket alignment position to another by linear movement of a pair of cables which are connected at one end to the derailleurs and which extend from same to a gearshift device which the rider operates to effect said linear movement of the cables.

A conventional gearshift provides two actuators, originally levers, more recently twistgrips, one for linearly positioning the cable leading to the front derailleur and the other for linearly positioning the cable leading to the rear derailleur. Depending upon the direction of movement of the two actuators the cables are caused to either pull the derailleurs from one sprocket alignment position to another or allow spring biases incorporated in the derailleurs to return the derailleurs to a previous sprocket alignment position.

The prior art provides such gearshift means in several configurations. In earliest configuration the gearshift is a unitary structure having two levers pivotally secured to and positioned upright on a common support bracket that is attached to the bicycle's frame or on the stem that supports the bicycle's handlebar. If mounted on the frame, the frame is equipped with pulley wheels or fixed guides which route the cables from the gearshift to the derailleurs. If mounted on the handlebar stem at least a portion of each cable extending from the gearshift to the bicycle's frame is enclosed in a flexible tubular casing which enables linear movement of the cables in an arcuate path in order that the bicycle can be steered; the casings having their ends stopped to prevent linear movement of the casings while permitting linear movement of the contained cables.

All such frame or stem mounted gearshifts have required the rider to release his grasp of one handgrip or the other in order to manipulate the lever which is positioned on one side or the other of the bicycle's frame or handlebar stem, as the case may be.

In order to improve safety and increase convenience in a later configuration the gearshift has comprised two distinct structures each carrying one lever; i.e., the system comprises two single-lever gearshift devices, one for controlling the front derailleur and the other for controlling the rear derailleur, which are mounted as close as possible to the handgrips for operation using the hand nearest each gearshift device while maintaining a grasp of both handgrips.

In one arrangement the support brackets of the two gearshifts are inserted into the ends of the tubular handlebar with the levers projecting outboard of the handgrips and the rider lifts or lowers the levers using his fingers or palms while a portion of his palms remains on the handgrips.

In another arrangement the support brackets of the two gearshifts are clamped on top of the handlebar inboard of and as close as possible to the handgrips. In this configuration the levers have been positioned on their sides for pivoting about vertical axes and the rider manipulates them with his thumbs while substantially maintaining his grasp of both handgrips. This arrangement has proven to be less than wholly satisfactory because it strains the hands to operate the levers while still holding onto the handgrips and the rider finds himself releasing a handgrip to operate an adjacent lever.

A recent improvement in such "two gearshift" configurations substitutes twistgrips for the levers. The twistgrips are cylindrical members concentrically rotatable about the longitudinal axis of straight end portions of a bicycle handlebar and are axially positioned on same inboard of and as close as possible to the handgrips conventionally provided on the handlebar and which remain stationary on the ends of the handlebar. The derailleur cables are connected to the twistgrips such that rotation of the twistgrips about the handlebar effects linear movement of the derailleur cables. To operate either twistgrip the rider wraps his hand around the twistgrip and rotates it one way or the other about the longitudinal axis of the handlebar while a portion of his palm overlies and rotates about the handgrip, ready to grasp it tightly should the need arise. The clamp fastening standard brake levers tends to interfere with such mode of operation because the relatively short levers require securing the clamps immediately adjacent the handgrips. More comfortable operation of such twistgrip gearshifts requires a specially designed brake lever that permits its clamp to be located further inboard from the handgrip so that a space is provided between such clamp and the handgrip for mounting a twistgrip gearshift immediately adjacent to the handgrip.

Although favored over prior concepts it is clear that the twistgrip gearshift has its limitations, including a diminished grasp of the handgrip during rotation of the twistgrip.

Of course a continuing limitation of all the above described configurations is that the rider must still operate two actuators to obtain a single result where simultaneous operation of both derailleurs is required.

It is not always obvious which actuator is to be repositioned or whether both actuators are to be repositioned simultaneously in order to effect a given desired gear ratio.

Many riders find it inconvenient and awkward having to manipulate two actuators in order to obtain a single result and experience difficulty in quickly obtaining the required combination of front and rear sprockets; e.g., for instantly shifting from highest to lower gear when stopping for easy startup and when suddenly confronted by a hill. Accordingly, a more convenient means has long been desired.

U.S. Pat. No. 3,808,907 to Yamaguchi discloses a gearshift for a dual derailleur bicycle wherein the gearshift has a single lever that is pivotable about a first axis for controlling one derailleur and is also pivotable about a second axis perpendicular to the first axis for controlling the other derailleur, but does not provide such lever centered on both axes of its pivotal movement. Instead, in each of five embodiments, although the lower end portion of Yamaguchi's lever is pivotally secured for rotation about a first axis so that only the upper end of the lever pivots uniformly about the first axis as shown in Yamaguchi's FIG. 3 for control of one derailleur cable, as recited in each of four claims, for control of the other derailleur cable the lever is "oscillatable on a pivot extending radially from" either a drum or a bevel gear that defines the second axis of the lever's pivotal movability, such drum or bevel gear holding the lever as a whole including its lower end portion positioned a substantial distance away from the second axis, with the undesirable result that the whole body of the lever must be moved arcuately about the second axis, whereby, instead of only the upper end of the lever comfortably pivoting from a centered position on the second axis, the operator experiences an awkward up and down movement of the lever as shown in Yamaguchi's FIG. 4.

Yamaguchi's gearshift is further limited by unnecessary complexity and therefore added cost and excessive weight as well as bulkiness requiring more space on a bicycle, all of which critically limit the practical usefulness of Yamaguchi's gearshift.

The present improvement provides a single actuator gearshift having its actuator centered on both the first and second axes of its pivotal movability so that the actuator pivots in a comfortable and uniform manner for control of either derailleur, and which is characterized by fewness of parts, lowest cost, compactness, light weight, and also, compatibility with any configuration of dual derailleur bicycle. A handlebar mounted embodiment adds the safety and convenience afforded by the twistgrip type of gearshift with the added advantage of a single actuator mode of operation for instant and easily learned shifting through all the gears.

BRIEF SUMMARY OF THE INVENTION

The invention provides a bicycle gearshift that is easier to operate for control of the front and rear derailleurs of a multispeed bicycle, by provision of a unitary structure accessible for manipulation with one hand, having manually operable means rotatable about a first axis for control of one derailleur and manually operable means rotatable about a second axis transverse to the first axis for control of the other derailleur.

More particularly, it is an object of the invention to provide in combination, support means attachable to a bicycle in fixed position and carrying a first cable pull member rotatable about a first axis for effecting linear movement of a first cable controlling one derailleur, a second cable pull member rotatable about a second axis transverse to the first axis for effecting linear movement of a second cable controlling the other derailleur, and manually operable means for effecting rotation of the first and second cable pull members about the first and second axes, respectively.

Still more particularly, a further object of the invention to provide the second cable pull member pivotally secured to the first cable pull member for rotation about a second axis perpendicular to the first axis and defining a single actuator movable within a first arc located within a first plane that extends axially of and contains the first axis to rotate the second cable pull member about the second axis and movable within a second arc located within a second plane that extends axially of and contains the second axis to rotate the first cable pull member about the first axis.

Another object is to provide a first embodiment wherein the first cable pull member is cylindrical and is rotatably mounted on support means attachable in fixed position near the handgrip at one end of a bicycle's handlebar, the first cable pull member being rotatable about a first axis substantially concentrically with a longitudinal axis of the bicycle's handlebar, and wherein the second cable pull member defines a single actuator that is pivotal about a second axis to effect rotation of the second cable pull member about the second axis and by virtue of attachment to the first cable pull member is also pivotal about the first axis to effect rotation of the first cable pull member about the first axis.

A further object pertaining to said first embodiment is to provide the actuator defined by the second cable pull member having a manually graspable portion that is pivotally movable within the first and second arcs described above.

A further object pertaining to said first embodiment is to provide said actuator preferably in the form of a yoke having first and second arms pivotally secured to the first cable pull member with one arm of the yoke defining the second cable pull member and a portion of the yoke intermediate its first and second arms defining a manually graspable portion of the yoke which is pivotally movable within the described first and second arcs.

A still further object pertaining to said first embodiment is to provide means for frictionally holding the first cable pull member at desired rotational settings, said means including an internally threaded ring or collar that is manually rotatable on a correspondingly externally threaded portion of the support means about and concentrically with the first axis and is thereby movable axially of the first axis for pushing friction washer means into adjustable frictional contact with the first cable pull member.

Another object is to provide a second embodiment wherein the first cable pull member is rotatably secured to support means attachable in fixed position anywhere on a bicycle but preferably to the stem that supports the bicycle's handlebar, wherein the actuator is in the form of a lever having a manually graspable upper end portion and a lower end portion defining the second cable pull member, and wherein the first cable pull member is notched for a centered positioning of the upper end portion of the lever for pivotal movement in the described first and second arcs.

And finally, it is an object of the invention to provide for each embodiment which is steerable with the bicycle's handlebar, the support means defining a first bracket member that is stationary with the support means and provides an anchorage for a casing associated with one derailleur cable that is operatively connected to the first cable pull member, and the first cable pull member defining a second bracket member that is rotatable with the first cable pull member and provides an anchorage for a casing associated with the other derailleur cable that is operatively connected to the second cable pull member.

BRIEF DESCRIPTION OF THE SEVERAL VIEWS OF THE DRAWINGS

FIG. 1 is a three-quarter general perspective view of a fully assembled first embodiment of the invention gearshift showing it with derailleur cables connected to it.

FIG. 1A is a schematic representation identifying first and second planes of movement of the yoke-shaped actuator shown in FIG. 1.

FIG. 2 is a three-quarter perspective view showing the FIG. 1 embodiment mounted on one end portion of a bicycle's handlebar with a rider's hand manipulating the gearshift's actuator to show the manner of its use.

FIG. 3 is a three-quarter perspective view showing in exploded relationship all the parts which comprise the FIG. 1 embodiment.

DETAILED DESCRIPTION OF THE INVENTION

Figure 4:
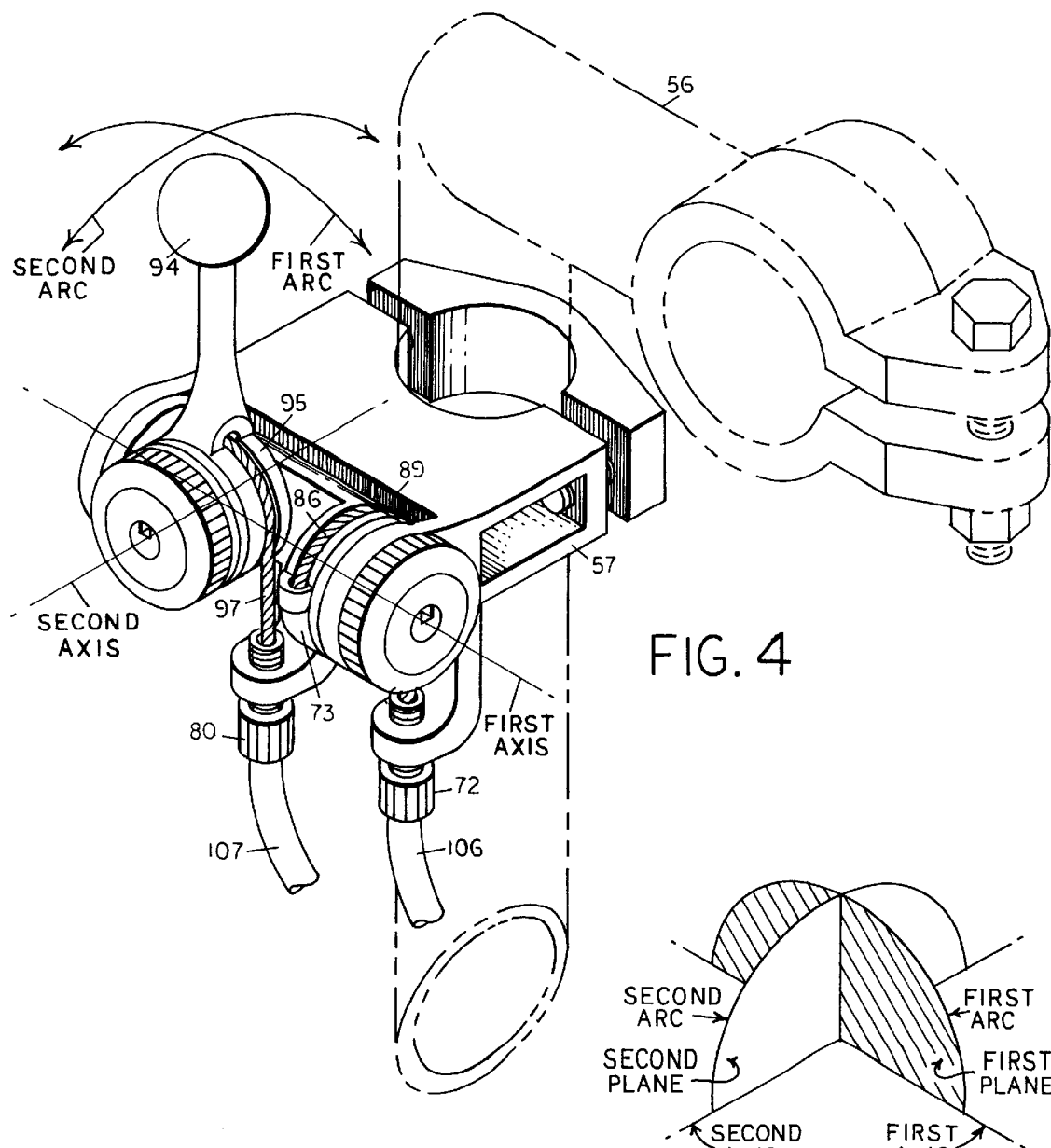
FIG. 4 is a three-quarter general perspective view of a fully assembled second embodiment of the invention gearshift showing it with derailleur cables connected to it and mounted on the stem which conventionally forms part of a bicycle's steering column and supports the bicycle's handlebar, the stem being represented with phantom lines.

FIG. 1 shows a fully assembled first embodiment of the invention gearshift indicated generally as 6 that mounts on a bicycle's handlebar and is operated by thumb as shown in FIG. 2 wherein an end portion only of the handlebar 7 is shown including a handgrip 8 and a brake lever 9, the gearshift 6 being positioned as close as possible to the handgrip 8 to the extent permitted by the brake lever 9 so that the rider maintains his grip on the handgrip 8 while pivotally manipulating an actuator 10, FIG. 1, by thumb along first and second arcs alternately in opposite directions within each arc as indicated by the arrows in FIG. 2.

Assuming conventional derailleur biases and a preferred connection of derailleur cables, manipulation of the actuator 10 within the first arc, FIG. 1, will transfer the bicycle's roller chain from one to another of the bicycle's front sprockets, and manipulation of the actuator within the second arc will transfer the bicycle's roller chain from one to another of the bicycle's rear sprockets. More particularly, assuming such preferred connection of derailleur cables, moving the actuator 10 forward or rearward (arrows 11, 12, respectively) will shift the bicycle's rear derailleur from one to another of the bicycle's rear sprockets, and moving the actuator 10 laterally right or left (arrows 13, 13A, respectively) will shift the bicycle's front derailleur from one to another of the bicycle's front sprockets. This is a logical mode of operation that makes it easy to learn and remember what does what. If there are two front sprockets the actuator 10 is pushed or pulled as far as it will go left or right; if there are three front sprockets the actuator 10 is centered as shown in FIG. 2 to position the bicycle's roller chain on the middle front sprocket.

Referring to FIG. 3 where the gearshift's parts are shown in exploded relationship, the gearshift 6 includes a support means indicated generally as 14 which comprises a cylindrical sleeve 15 having a first bracket member 16 fixed to one end of the sleeve 15. The mounting of the assembled gearshift 6 shown in FIG. 2 is effected either prior to attachment of the brake lever 9 and handgrip 8, or, in the case of a retrofit, by removing the handgrip 8 and brake lever 9, sliding the gearshift 6 onto the handlebar 7 and then replacing the brake lever 9 and handgrip 8. When positioned axially as close as possible to the handgrip 8 for easy reach by thumb and positioned rotationally as preferred for most comfortable operation, a setscrew 17, FIGS. 2 and 3, provided in the first bracket member 16 is tightened whereby the support means 14, FIG. 3, is fixed to the handlebar 7, FIG. 2.

A cylindrical first cable pull member 18, FIG. 3, is rotatably mounted on the sleeve 15 for rotation about a first axis (labeled in FIGS. 1, 1A and 3) which substantially corresponds with a longitudinal axis 19, FIG. 2, of the handlebar 7 so as to rotate about and substantially concentrically with said longitudinal axis 19 of the handlebar 7. The first cable pull member 18 is axially secured to the sleeve 15 by means of a retaining ring 20 which engages a circumferential groove 21 in the sleeve 15. The yoke-shaped actuator 10, FIG. 3, has first and second arms 22, 23, respectively, pivotally secured to the first cable pull member 18 for rotation about a second axis (labeled in FIGS. 1, 1A and 3) which lies perpendicular to the first axis. A lower end portion of the first arm 22 of the actuator 10 defines a cylindrical second cable pull member 24 which is rotatable concentrically about the second axis.

Although FIG. 1 shows the first and second axes in intersection it is not essential that they be in intersection in order to achieve the desired centering of the actuator 10 on the first and second axes, and it is anticipated that there may be advantage to mounting the second axis below the first axis in order increase the leverage of the actuator 10 about its first and second axes of pivotal movement.

As represented schematically in FIG. 1A, the actuator 10 (FIG. 1) is centered on the first and second axes so that it is movable within a first arc that is located within a first plane that extends axially of and includes the first axis, and is also movable within a second arc that is located within a second plane that extends axially of and includes the second axis. FIG. 1A is provided merely to identify the first and second planes referred to and does not necessarily indicate the actual angular range of movement of the actuator 10.

Pivotal movement of the actuator 10, FIG. 1, within the first arc effects rotation of the second cable pull member 24 about the second axis; and pivotal movement of the actuator 10 within the second arc effects rotation of the first cable pull member 18 about the first axis.

As is well known, derailleur cables have a slug permanently fixed to one end of the cable that facilitates connection of the cable to a receiving gearshift component and stops linear movement of the cable in at least one direction depending upon the specific configuration of such receiving gearshift component. The component to which the cable is connected necessarily has an opening that permits threading the cable through it while blocking passage of the relatively larger diameter slug, the referred to opening commonly being larger in diameter at one end so as to receive the slug and at least partially conceal it for neat appearance. In FIGS. 1 and 2 wherein the derailleur cables are seen connected to the gearshift 6, the slugs which are provided on the extreme ends of the derailleur cables shall be understood to be the means by which the derailleur cables are connected to the first and second cable pull members 18, 24, respectively. Tension applied to the cables after installation by means of cable tension adjustment screws 25, 26, assures that the cables will move linearly in response to manipulation of the actuator 10. FIG. 1 shows the actuator's first arm 22 having an opening 27 which shall be understood to have mounted therein the slug that is fixed to the extreme end of the cable that winds about the second cable pull member 24 (the cable wire is hidden from view), the opening 27 being relatively smaller in diameter at the unseen far side of the first arm 22 so that the slug cannot pass through the smaller end of the opening 27. Accordingly, in the case of the actuator 10, its first arm 22 conveniently provides a place for connection of the derailleur cable that winds about the second cable pull member 24. In accordance with common practice the second cable pull member 24 is provided with a groove 28, FIG. 3, that is aligned with the opening 27 and extends circumferentially at least part way around the second cable pull member 24 within which groove 28 the cable lies for maintaining a proper alignment for winding onto the second cable pull member 24.

For the same purpose, a lug 29, FIG. 3, is formed on the first cable pull member 18 having an opening 30 for connection of a derailleur cable to the first cable pull member 18 and the first cable pull member 18 is provided with a circumferential groove 31 within which the cable lies for maintaining a proper alignment for winding onto the first cable pull member 18; the lug 29 being rotationally positioned as shown out of potential interference with the rider's thumb (FIG. 2) when he pushes the actuator 10 in the direction indicated by arrow 13A in FIG. 2.

On any gearshift that is steerable with the bicycle's handlebar the derailleur cables conventionally include flexible tubular casings which enclose at least a portion of the cables extending between the free ends of the cables and the bicycle's frame (in some configurations these flexible tubular casings enclose a major portion of the cables extending between the gearshift and the derailleurs). The flexible tubular casings enable linear movement of the enclosed cables in an arcuate path as the handlebar is steered.

The term "free ends" as used herein always refers to those end portions of the cables which are windable about and are connected to the first and second cable pull members 18, 24, respectively, as opposed to the opposite end portions of the cables which are connected to and operatively associated with the derailleurs.

In FIGS. 1 and 2, the free end 32 of a first cable which is connected to the first cable pull member 18 can be seen wound about the first cable pull member 18 and lying in the groove 31 (FIG. 3). The free end of a second cable which is connected to the second cable pull member 24 is hidden from view on the other side of the second cable pull member 24. In FIGS. 1 and 2 a short section of a first flexible tubular casing 33 is associated with the free end 32 of the cable that is wound about the first cable pull member 18, and a short section of a second flexible tubular casing 34 is associated with the unseen free end of a second cable that is wound about the second cable pull member 24.

Conventionally, either the bicycle's frame or the derailleurs defines fixed points preventing linear movement of a first end of the flexible tubular casings, and the gearshift defines fixed points preventing linear movement of a second end of the flexible tubular casings. Conventionally and in the present instance as well, the second ends of the flexible tubular casings are received in and anchored by the cable tension adjustment screws 25, 26, which conventionally have a bore through their length through which the cable is threaded, the bore being enlarged at the screw's head to receive and anchor the end of the casing that encloses the cable. This is seen in FIGS. 1 and 2 wherein the first flexible tubular casing 33 has its second end recessed in the head of the first cable tension adjustment screw 25, and the second flexible tubular casing 34 has its second end recessed in the head of the second cable tension adjustment screw 26.

The first cable tension adjustment screw 25, FIG. 3, is received in a threaded hole 35 in the first bracket member 16 whereby a fixed point is defined for the second end of the first flexible tubular casing 33 (FIGS. 1 and 2) which is associated with the free end 32 of the cable that winds about the first cable pull member 18.

The term "fixed point" means not movable linearly like the cable. In the case of the first bracket member 16 such fixed point is not movable in any other manner as well, but in the case of the cable that winds about the second cable pull member 24 such fixed point must be movable about the first axis so that it stays with the second cable pull member 24 whenever the second cable pull member 24 if caused to rotate about the first axis as a result of pivotal movement of the actuator 10 within the second arc. Accordingly, the first cable pull member 18, FIGS. 1 and 3, defines a second bracket member 36 that is rotatable with the first cable pull member 18 about the first axis and it is provided with a threaded hole 37 that receives the second cable tension adjustment screw 26, FIG. 3, whereby a fixed point is defined for the second end of the second flexible tubular casing 34 (FIGS. 1 and 2) which is associated with the unseen free end of the cable that winds about the second cable pull member 24, but which fixed point is rotatable with the first cable pull member 18 about the first axis.

Referring to FIG. 3, it is assumed that at least the actuator 10 component of the gearshift 6 will be made of a plastic material having a degree of resiliency that will make it possible to spread the first and second arms 22, 23, apart slightly. With this capability in mind, the first cable pull member 18 economically integrally defines a projecting pivot 38 which is received in the opening 39 in the second arm 23 of the actuator 10, the second arm 23 being spread away from the first arm 22 to permit this to be done. A removable pivot, indicated generally as 40, FIG. 3 (which may be made of steel) facilitates mounting the first arm 22, by insertion of the pivot 40 (after positioning the first arm 22) through opening 40A which is provided in the first cable pull member 18, and through opening 40B which is provided in the second cable pull member 24. The pivot 40 is provided having a square head 41 for nonrotatable mounting within a recess (not shown) which is provided in the inside wall of the first cable pull member 18, the pivot 40 having a smooth portion 42 upon which the second cable pull member 24 rotates, and having a threaded end portion 43 that is provided with a groove 44 that extends axially of the pivot's threaded end portion 43. The pivot 40 is installed from inside the first cable pull member 18 as indicated by the arrow attached to the pivot 40 which indicates insertion into the cylindrical interior of the first cable pull member 18.

Various means are conventionally employed in the art which are suitable for yieldably holding the first and second cable pull members at given desired rotational settings. An adjustable frictional contact means is preferred here so that the gearshift 6 can be retrofitted to any dual derailleur bicycle, the configurations of which may differ with respect to number of front and rear sprockets, length and arrangement of derailleur cables, and slightly different operating characteristics of different brands and models of derailleurs.

Still referring to FIG. 3, for frictionally maintaining the first cable pull member 18 at desired rotational settings the first bracket member 16 includes a cylindrical externally threaded portion 45 that is concentric with the first axis on a side of the first bracket member 16 that faces the first cable pull member 18, and a manually rotatable internally threaded ring 46 is threaded onto the externally threaded portion 45.

The sleeve 15 is provided with at least one groove 47 (four are shown) extending axially of the first axis, and a washer 48 having at least one tab 49 (four are shown, corresponding with the four grooves shown on the sleeve 15) on its inside diameter is slid onto the sleeve 15 with the tab 49 in the groove 47 whereby in finally mounted position the washer 48 is slidably axially of the sleeve 15 but is not rotatable around the sleeve 15. The nonrotatable washer 48 may be sufficient to effect the desired frictional contact by itself, but an additional washer 50 made of a composition material enhancing friction is preferably interposed between the nonrotatable washer 48 and the end 51 of the first cable pull member 18. By turning the ring 46 on the threaded portion 45 of the first bracket member 16 the ring 46 is caused to move axially of the first axis and thereby push the nonrotatable washer 48 and thereby the friction washer 50 into frictional contact with the end 51 of the first cable pull member 18; the nonrotatable washer 48 being nonrotatably engaged with the sleeve 15 in order that rotation of the first cable pull member 18 about the first axis will not likewise affect the ring 46 and rotate it out of its manually selected rotational setting.

Still referring to FIG. 3, for frictionally maintaining the second cable pull member 24 at desired rotational settings a second manually adjustable internally threaded ring 52 is mounted on the threaded portion 43 of pivot 40. A second nonrotatable washer 53 has a tab 54 that engages the groove 44 in pivot 40 and a second composition friction washer 55 is preferably interposed between the second nonrotatable washer 53 and the second cable pull member 24 (the latter being in mounted position of course). By turning the second ring 52 on the threaded portion 43 of pivot 40, the second ring 52 is caused to move axially of the second axis and thereby push the second nonrotatable washer 53 and thereby the second friction washer 55 into frictional contact with the second cable pull member 24, the end surface of which has a diameter corresponding with that of the second friction washer 55; the second nonrotatable washer 53 being nonrotatably engaged with the pivot groove 44 in order that rotation of the second cable pull member 24 about the second axis will not likewise affect the second ring 52 and rotate it out of its manually selected rotational setting.

Figure 5:
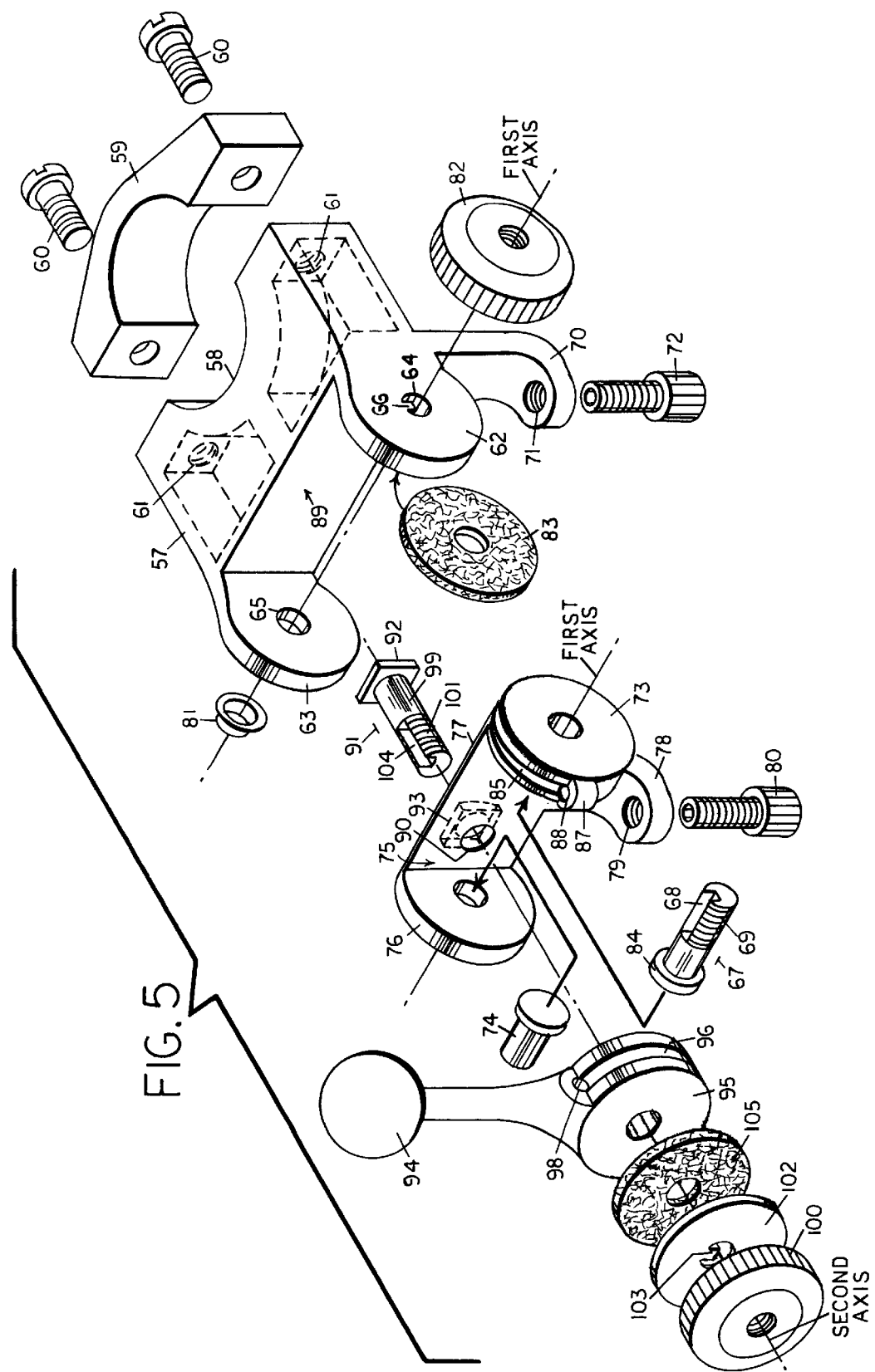
FIG. 5 is a three-quarter perspective view showing in exploded relationship all the parts which comprise the FIG. 4 embodiment.

A second embodiment of the invention gearshift is illustrated in FIGS. 4 and 5 which obtains a clamped-on attachment to the bicycle's handlebar stem 56, FIG. 4 (shown in phantom lines and removed from the bicycle's steering column) but may be mounted on the bicycle's frame by obvious modification of the clamp arrangement.

Referring to FIG. 5 this embodiment comprises a support means 57 which carries the operative elements of the gearshift and has a portion at 58 defining one half of a clamp which cooperates with a bar 59 which defines the other half of the clamp and through which machine screws 60 are inserted and threaded into threaded openings 61 provided in the support means 57.

Figure 4A:
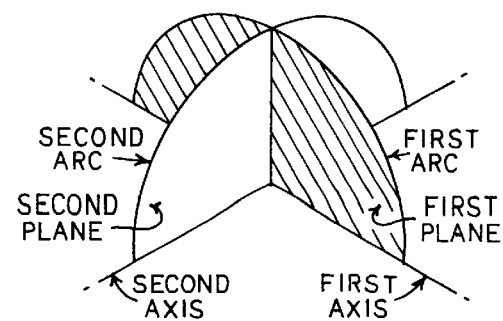
FIG. 4A is a schematic representation identifying first and second planes of movement of the gearshift lever shown in FIG. 4.

The support means 57 has spaced apart first and second lugs 62, 63, respectively, which are provided with first and second openings 64, 65, respectively, aligned on a first axis which is labeled in FIGS. 4 and 5 and schematically indicated in FIG. 4A, the first opening 64 having a tab 66 for nonrotatably receiving a first pivot indicated generally as 67 having a groove 68 extending axially through a threaded end portion 69 of the nonrotatable (when installed) pivot 67. The support means 57 further defines a first bracket member 70 having a threaded hole 71 which receives a first cable adjustment screw 72.

Still referring to FIG. 5, a cylindrical first cable pull member 73 is pivotally secured to the support means 57 between the lugs 62, 63, by means of the nonrotatable pivot 67 and a second pivot 74 for arotation about said first axis, the first cable pull member 73 defining a notch 75 (the lead arrow pointing to the space and not structure) between the first cable pull member 73 and a second end portion 76 of the first cable pull member 73. A portion 77 connecting together the ends 73, 76, defines a second bracket member 78 that is rotatable with the first cable pull member 73 about said first axis, the second bracket member 78 having a threaded hole 79 which receives a second cable adjustment screw 80. A cap nut 81 secures the second pivot 74 and a manually adjustable internally threaded first ring 82 secures the nonrotatable pivot 67. A friction washer 83 made of a friction enhancing composition material is positioned between the first lug 62 and the first cable pull member 73. By turning the ring 82 the head 84 of the nonrotatable pivot 67 is caused to pull the first cable pull member 73 toward the first lug 62 with the friction washer 83 sandwiched therebetween, effecting a frictional contact between the first cable pull member 73 and the first lug 62 of the support means 57 that holds the first cable pull member 73 at desired rotational settings.

Still referring to FIG. 5, the first cable pull member 73 is provided with a circumferential groove 85 extending at least partially around the cylindrical first cable pull member 73 within which groove 85 a free end portion of a first derailleur cable 86, FIG. 4, lies for proper alignment with the first cable pull member 73, and a lug 87, FIG. 5, having an opening 88 in it is provided for securing the slug conventionally provided on the extreme end of such derailleur cable.

For maximum compactness after assembly as shown in FIG. 4, the design of the first cable pull member 73 is preferably as shown best in FIG. 5 which is like an elongate cylindrical rod which is bored for pivotal mounting and is notched between end portions of the cylindrical rod whereby it may be positioned as close as possible to the adjacent wall 89, FIGS. 4 and 5, of the support means 57 without interference with same during rotation about the first axis.

The connecting portion 77, FIG. 5, is provided with an opening 90 that receives a third pivot indicated generally as 91 having a square head 92 that is received in a corresponding square recess 93 (indicated by broken lines to indicate that it is hidden in this view) which is provided in connecting portion 77 of the first cable pull member 73 whereby the pivot 91 is nonrotatably mounted in the opening 90, the pivot 91 being axially aligned on a second axis which is labeled in FIG. 5 as well as in FIG. 4 and is schematically indicated in FIG. 4A.

Referring to FIG. 5, in this embodiment the actuator 94 is a lever having its lower end portion defining a second cable pull member 95 which is cylindrical and is provided with a circumferential groove 96 for receiving the free end portion of a second derailleur cable 97, FIG. 4, the groove 96 being aligned with an opening 98, FIG. 5, provided in the lower end portion of actuator 94 for securing the slug conventionally provided at the extreme end of such derailleur cable.

The second cable pull member 95 mounts on the smooth portion 99 of pivot 91 for rotation about the second axis and is secured to pivot 91 by means of a second manually adjustable internally threaded ring 100 which engages the threaded end portion 101 of pivot 91. A nonrotatable washer 102 includes a tab 103 that engages a groove 104 in pivot 91 whereby the washer 102 is not rotatable about the second axis but is slidable axially of the second axis. Preferably a second friction washer 105 is interposed between the nonrotatable washer 102 and the second cable pull member 95 to enhance frictional contact therebetween. Turning the second ring 100 pushes the nonrotatable washer 102 and thereby the friction washer 105 into frictional contact with the second cable pull member 95 and thereby holds the second cable pull member 95 at desired rotational settings.

In FIG. 4 this second embodiment of the invention gearshift is seen fully assembled and having the free ends of first and second derailleur cables 86, 97, connected to the first and second cable pull members 73, 95, respectively; the cables having the second ends of first and second flexible tubular casings 106, 107, received in and anchored by the first and second cable adjustment screws 72, 80, respectively, only short sections of such flexible tubular casings being shown.

In this second embodiment (as in the first embodiment) the actuator 94, FIG. 4, is centered on both the first and second axes such that the actuator 94 is pivotally movable within a first arc which is located in a first plane (FIG. 4A) that extends axially of and contains the first axis, and the actuator 94 is also pivotally movable within a second arc which is located in a second plane (FIG. 4A) that extends axially of and contains the second axis.

Pivotal movement of the actuator 94 within the second arc effects rotation of the first cable pull member 73 about the first axis, and pivotal movement of the actuator 94 within the first arc effects rotation of the second cable pull member 95 about the second axis.

Assuming conventional derailleur biases and a preferred connection of derailleur cables wherein the first derailleur cable 86 is connected to the bicycle's front derailleur and the second derailleur cable 97 is connected to the bicycle's rear derailleur, manipulation of the actuator 94 within the second arc, FIGS. 4 and 4A, will transfer the bicycle's roller chain from one to another of the bicycle's front sprockets, and manipulation of the actuator 94 within the first arc will transfer the bicycle's roller chain from one to another of the bicycle's rear sprockets. If there are two front sprockets the actuator 94 is positioned left or right as far as it will go; if there are three front sprockets the actuator 94 is centered within the second arc as shown in FIG. 4 to position the bicycle's roller chain on the middle front sprocket.

Concluding, representative first and second embodiments of the invention gearshift have been shown and described in each of which the rider advantageously has simultaneous control of both derailleurs whereby the full range of gear ratios available can be consecutively selected by a zig-zagging manipulation of the single actuator and whereby shifting from highest to lowest speed (for easy startup after a stop or for quickly downshifting when suddenly confronted by a hill) is instantly accomplished with unprecedented ease; wherein the inexperienced rider may choose to control only one derailleur; e.g., the rear derailleur for selecting only those speeds obtainable on a given high or low range depending upon which front sprocket is utilized while shifting only from one to another of the rear sprockets; and wherein due to the centered position of the actuator on each axis of its pivotal movability the mode of manipulation of the actuator is uniform about each axis, lending itself, particularly in the case of the first embodiment, to easy access for manipulation by thumb while maintaining a grasp of the handlebar grip.

I claim:

1. A gearshift for use on a bicycle that has multiple front sprockets mounted on a pedal crank axis, multiple rear sprockets mounted on a rear wheel axis, a roller chain forming a closed loop about and connecting together one each of said front and rear sprockets, a front derailleur and a rear derailleur associated with said front and rear sprockets and movable axially of said pedal crank and rear wheel axes into given front and rear sprocket alignment positions for positioning said roller chain on said front and rear sprockets, respectively, and a pair of cables connected one each to said derailleurs for effecting said axial movement of said derailleurs in response to linear movement of said cables, said bicycle including cable guide means arranged between said derailleurs and free ends of said cables for restricting said cables to said linear movement; said gearshift comprising:

support means attachable to said bicycle in fixed position;

a first cable pull member pivotally secured to said support means for rotation about a first axis, said first cable pull member being adapted to secure the free end of a first one of said cables for effecting linear movement of said first one of said cables by rotation of said first cable pull member about said first axis;

a second cable pull member pivotally secured to said first cable pull member for rotation about a second axis perpendicular to said first axis, said second cable pull member being adapted to secure the free end of the other one of said cables for effecting linear movement of said other one of said cables by rotation of said second cable pull member about said second axis;

said second cable pull member defining a manually operable actuator centered on said first and second axes for pivotal movability within a first arc located within a first plane that extends axially of and contains said first axis to rotate the second cable pull member about said second axis and for pivotal movability within a second arc located within a second plane that extends axially of and contains the said second axis to rotate said first cable pull member about said first axis; and, means for holding said first and second cable pull members at rotational settings.

2. A gearshift as in claim 1 wherein said first cable pull member is provided with a notch defined between first and second end portions of said first cable pull member, said first axis passes through said first and second end portions, said second axis is located in said notch between said first and second end portions and one of said end portions is adapted to secure said free end of said first one of said cables, and wherein said actuator is a lever having a manually graspable upper end portion aligned with said first axis for pivotal movability within said first arc and having a lower end portion defining said second cable pull member, said second cable pull member being pivotally secured to said first cable pull member within said notch for rotation about said second axis.

3. A gearshift as in claim 1 for use where said cable guide means of said bicycle includes a pair of flexible tubular casings which enclose at least a portion of said cables near said free ends of said cables for enabling linear movement of the enclosed cable portions in an arcuate path, said bicycle including means defining fixed points preventing linear movement of first ends of said casings which are located furthest from said free ends of said cables; said gearshift further comprising:

said support means defining a first bracket member stationary with said support means and defining an anchorage for a second end of a first one of said flexible tubular casings associated with said first one of said cables;

said first cable pull member defining a second bracket member rotatable with said first cable pull member and defining an anchorage for a second end of a second one of said flexible tubular casings associated with said other one of said cables.

4. A gearshift as in claim 3 wherein said support means defines a pair of lugs spaced apart parallel to each other;

wherein said first cable pull member is an elongate member secured to said support means between said lugs for rotation about said first axis, said first cable pull member having first and second end portions at least one of which end portions is cylindrical, said cylindrical end portion being adapted to secure the free end of said first one of said cables and being concentrically rotatable about said first axis for winding said free end of said first one of said cables about said cylindrical end portion of said first cable pull member;

wherein said first cable pull member is provided with a notch defined between first and second end portions of said first cable pull member, said first axis passing through said first and second end portions and across said notch;

wherein said actuator is a lever having a manually graspable upper end portion and having a cylindrical lower end portion defining said second cable pull member and adapted to secure the free end of said other one of said cables;

wherein said second cable pull member is rotatably secured to said first cable pull member within said notch such that said manually graspable upper end portion of said lever is aligned with said first axis for pivotal movability within said first arc axially of said first axis to effect rotation of said second cable pull member about said second axis for winding said other one of said cables about said cylindrical second cable pull member;

wherein said first bracket member depends from said support means between said lugs and is tangentially aligned with said cylindrical end portion of said first cable pull member for guiding the free end of said first one of said cables onto said cylindrical end portion of said first cable pull member; and, wherein said second bracket member depends from said first cable pull member and is tangentially aligned with said cylindrical lower end portion of said lever for guiding the free end of said other one of said cables onto said second cable pull member.

5. A gearshift for use on a bicycle that has a handlebar, multiple front sprockets mounted on a pedal crank axis, multiple rear sprockets mounted on a rear wheel axis, a roller chain forming a closed loop about and connecting together one each of said front and rear sprockets, a front derailleur and a rear derailleur associated with said front and rear sprockets and movable axially of said pedal crank and rear wheel axes into given front and rear sprocket alignment positions for positioning said roller chain on said front and rear sprockets, respectively, and a pair of cables connected one each to said derailleurs for effecting said axial movement of said derailleurs in response to linear movement of said cables, said bicycle including cable guide means arranged between said derailleurs and free ends of said cables for restricting said cables to linear movement, said cable guide means including a pair of flexible tubular casings which enclose at least a portion of said cables near the free ends of said cables for enabling linear movement of the enclosed cable portions in an arcuate path, said bicycle including means defining fixed points preventing 1 linear movement of first ends of said casings which are located furthest from said free ends of said cables; said gearshift comprising:

support means attachable to said handlebar in fixed position and manually rotatable means mounted on said support means defining:

a first cable pull member rotatable about a first axis corresponding with a longitudinal axis of said handlebar so as to rotate substantially concentrically with said longitudinal axis of said handlebar, said first cable pull member being adapted to secure the free end of a first one of said cables for effecting linear movement of said first one of said cables by rotation of said first cable pull member about said first axis; and, a second cable pull member rotatable about a second axis transverse to said first axis, said second cable pull member being adapted to secure the free end of the other one of said cables and effecting linear movement of said other one of said cables by rotation of said second cable pull member about said second axis;

means for holding said first and second cable pull members at rotational settings;

means defining a fixed point preventing linear movement of a second end of the casing associated with said free end of said first one of said cables; and, means defining a fixed point preventing linear movement of a second end of the casing associated with said free end of said other one of said cables.

6. A gearshift as in claim 5 wherein said second cable pull member defines an actuator having a manually graspable portion pivotable to effect rotation of said second cable pull member about said second axis.

7. A gearshift as in claim 6 wherein said second cable pull member is pivotally secured to said first cable pull member for rotation with said first cable pull member about said first axis, whereby said actuator is pivotable about said second axis to effect rotation of said second cable pull member about said second axis and is also pivotable about said first axis to effect rotation of said first cable pull member about said first axis.

8. A gearshift as in claim 7 wherein said support means defines a first bracket member stationary with said support means for guiding the free end of said first one of said cables onto said first cable pull member, said first bracket member defining said fixed point preventing linear movement of said second end of the casing associated with said free end of said first one of said cables;

and wherein said first cable pull member defines a second bracket member rotatable with said first cable pull member about said first axis for guiding the free end of said other one of said cables onto said second cable pull member, said second bracket member defining said fixed point preventing linear movement of said second end of the casing associated with said free end of said other one of said cables.

9. A gearshift as in claim 8 wherein said second axis is perpendicular to said first axis, wherein rotation of said second cable pull member about said second axis is effected by pivotal movement of a manually graspable portion of said actuator within a first arc that is located within a first plane that extends axially of and contains said first axis, and wherein rotation of said first cable pull member about said first axis is effected by pivotal movement of said manually graspable portion of said actuator within a second arc that is located within a second plane that extends axially of and contains said second axis.

10. A gearshift as in claim 9 wherein said actuator defines a yoke receiving said first cable pull member between first and second arms of said yoke, wherein said first and second arms of said yoke are pivotally secured to said first cable pull member for rotation about said second axis and one of said arms of said yoke defines said second cable pull member, and wherein a portion of said yoke located between said first and second arms defines said manually graspable portion of said actuator.

11. A gearshift as in claim 10 wherein said first cable pull member has a length as measured axially of said first axis that is long enough only to enable mounting said actuator and for winding said first one of said cables about said first cable pull member so that said length is short enough to preclude provision of a handhold suitable for manually grasping said first cable pull member for directly twisting said first cable pull member about said first axis.

12. A gearshift as in claim 8 wherein said support means defines a cylindrical sleeve having a longitudinal axis corresponding with said first axis, said sleeve having an inside diameter suitable for mounting said sleeve on said handlebar by receipt of an end portion of said handlebar inside said sleeve, wherein said first bracket member is fixed to one end of said sleeve, wherein said first cable pull member is rotatably mounted on said sleeve near said first bracket member, and wherein said first one of said cables winds onto said first cable pull member at an end of said first cable pull member nearest said first bracket member.

13. A gearshift as in claim 8 wherein said means for holding said first cable pull member at rotational settings comprises said first bracket member including a cylindrical externally threaded portion that is located on a side of said first bracket member facing said first cable pull member and is concentric with said first axis, a manually rotatable correspondingly internally threaded ring mounted on said externally threaded portion of said first bracket member, said sleeve being provided with a groove extending axially of said first axis, and washer means including a tab on an inside diameter of said washer means, said tab being engaged with said groove so as to prevent rotation of said washer means about said first axis but permitting slidable movement of said washer means axially of said first axis, wherein by turning said ring on said threaded portion of said first bracket member said ring is caused to move axially of said first axis and thereby push said washer means into manually adjustable frictional contact with said first cable pull member.

14. A gearshift as in claim 9 wherein said means for holding said second cable pull member at rotational settings comprises:

said first cable pull member being provided with a removable pivot member mounted axially of said second axis for pivotal attachment of said end of said yoke defining said second cable pull member, said first cable pull member being provided with an opening for receiving said pivot member, said pivot member having a head portion nonrotatably mounted recessed in an inside wall of said first cable pull member and having a shaft portion of said pivot member extending through said opening and projecting outboard of said first cable pull member, said shaft portion having a smooth portion upon which said second cable pull member is rotatably mounted and having a threaded end portion provided with a groove extending through said threaded end portion axially of said second axis;

second washer means including a second tab on an inside diameter of said second washer means, said second tab being engaged with the groove provided in the threaded end portion of said pivot member so as to prevent rotation of said second washer means about said second axis but permitting slidable movement of said second washer means axially of said second axis; and, a manually rotatable correspondingly internally threaded second ring mounted on said threaded end portion of said pivot member;

wherein by turning said second ring on said threaded end portion of said pivot member said second ring is caused to move axially of said second axis and thereby push said second washer means into manually adjustable frictional contact with said second cable pull member.

15. A gearshift for use on a bicycle that has a handlebar, multiple front sprockets mounted on a pedal crank axis, multiple rear sprockets mounted on a rear wheel axis, a roller chain forming a closed loop about and connecting together one each of said front and rear sprockets, a front derailleur and a rear derailleur associated with said front and rear sprockets and movable axially of said pedal crank and rear wheel axes into given front and rear sprocket alignment positions for positioning said roller chain on said front and rear sprockets, respectively, and a pair of cables connected one each to said derailleurs for effecting said axial movement of said derailleurs in response to linear movement of said cables, said bicycle including cable guide means arranged between said derailleurs and free ends of said cables for restricting said cables to linear movement, said cable guide means including a pair of flexible tubular casings which enclose at least a portion of said cables near the free ends of said cables for enabling linear movement of the enclosed cable portions in an arcuate path, said bicycle wherein said means defining fixed points preventing linear movement of first ends of said casings which are located furthest from said free ends of said cables; said gearshift comprising:

support means attachable to an end portion of said handlebar in fixed position, said support means including a cylindrical sleeve having a longitudinal axis defining a first axis of said gearshift and being adapted for mounting on said end portion of said handlebar substantially concentric with a longitudinal axis of said end portion of said handlebar, said support means further including a first bracket member fixed to one end of said sleeve for mounting on said end portion of said handlebar stationary with said sleeve;

a cylindrical first cable pull member mounted on said sleeve near said first bracket member for concentric rotation about said first axis, said first cable pull member being adapted to secure the free end of a first one of said cables for effecting linear movement of said first one of said cables by rotation of said first cable pull member about said first axis;

an actuator in the form of a yoke having first and second arms of said yoke pivotally secured to said first cable pull member for rotation about a second axis perpendicular to said first axis, a portion of said yoke located between said first and second arms of said yoke defining a manually graspable portion of said actuator and one of said arms of said yoke defining a cylindrical second cable pull member concentrically rotatable about said second axis;

said second cable pull member being adapted to secure the free end of the other one of said cables for effecting linear movement of said other one of said cables by rotation of said second cable pull member about said second axis;

said manually graspable portion of said actuator being pivotally movable within first and second arcs, said first arc being located within a first plane that extends axially of and contains said first axis and when pivotally moved within said first arc said actuator effecting rotation of said second cable pull member about said second axis, and said second arc being located within a second plane that extends axially of and contains said second axis and when pivotally moved within said second arc said actuator effecting rotation of said first cable pull member about said first axis;

means arranged axially of said first and second axes for holding said first and second cable pull members at rotational settings;

said first bracket member being tangentially aligned with said first cable pull member for guiding said first one of said cables onto said first cable pull member and defining a fixed point preventing linear movement of a second end of the casing associated with said free end of said first one of said cables; and, said first cable pull member defining a second bracket member rotatable with said first cable pull member about said first axis and tangentially aligned with said second cable pull member for guiding said other one of said cables onto said second cable pull member and defining a fixed point preventing linear movement of a second end of the casing associated with said free end of said other one of said cables.

16. A gearshift as in claim 15 wherein said first cable pull member has a length as measured axially of said first axis that is long enough only to enable mounting said actuator and for winding said first one of said cables about said first cable pull member so that said length is short enough to preclude provision of a handhold suitable for manually grasping said first cable pull member for directly twisting said first cable pull member about said first axis.

17. A gearshift as in claim 16 including means for holding said first cable pull member at rotational settings comprises said first bracket member including a cylindrical externally threaded portion that is located on a side of said first bracket member facing said first cable pull member and is concentric with said first axis, a manually rotatable correspondingly internally threaded ring mounted on said externally threaded portion of said first bracket member, said sleeve being provided with a groove extending axially of said first axis, and washer means including a tab on an inside diameter of said washer means, said tab being engaged with said groove so as to prevent rotation of said washer means about said first axis but permitting slidable movement of said washer means axially of said first axis, wherein by turning said ring on said threaded portion of said first bracket member said ring is caused to move axially of said first axis and thereby push said washer means into manually adjustable frictional contact with said first cable pull member.

18. A gearshift as in claim 17 wherein said first one of said cables winds onto said first cable pull member at an end of said first cable pull member nearest said manually adjustable ring.

19. A gearshift as in claim 18 wherein said means for holding said second cable pull member at rotational settings, comprising:

said first cable pull member being provided with a removable pivot member mounted axially of said second axis for pivotal attachment of said end of said yoke defining said second cable pull member, said first cable pull member being provided with an opening for receiving said pivot member, said pivot member having a head portion nonrotatably mounted recessed in an inside wall of said first cable pull member and having a shaft portion of said pivot member extending through said opening and projecting outboard of said first cable pull member, said shaft portion having a smooth portion upon which said second cable pull member is rotatably mounted and having a threaded end portion provided with a groove extending through said threaded end portion axially of said second axis;

second washer means including a second tab on an inside diameter of said second washer means, said second tab being engaged with the groove provided in the threaded end portion of said pivot member so as to prevent rotation of said second washer means about said second axis but permitting slidable movement of said second washer means axially of said second axis; and, a manually rotatable correspondingly internally threaded second ring mounted on said threaded end portion of said pivot member;

wherein by turning said second ring on said threaded end portion of said pivot member said second ring is caused to move axially of said second axis and thereby push said second washer means into manually adjustable frictional contact with said second cable pull member.

* * * * *